United States Patent [19]

Bomberger

[11] 3,779,862

[45] Dec. 18, 1973

[54] FLEXIBLE, INTERMEDIATE TEMPERATURE, MINERAL WOOL BOARD

[75] Inventor: Henry A. Bomberger, Landisville, Pa.

[73] Assignee: Armstrong Cork Company, Lancaster, Pa.

[22] Filed: Dec. 21, 1971

[21] Appl. No.: 210,593

[52] U.S. Cl................ 162/152, 162/183, 260/41 A
[51] Int. Cl. .............................................. D21f 11/02
[58] Field of Search.................... 162/152; 260/41 A

[56] References Cited
UNITED STATES PATENTS 3,573,158   3/1971   Pall et al............................ 162/145
3,082,145   3/1963   Kao.................................... 162/158

FOREIGN PATENTS OR APPLICATIONS 1,016,105   1/1966   Great Britain...................... 162/158

Primary Examiner—Allan Lieberman
Assistant Examiner—J. H. Derrington
Attorney—Clifford B. Price

[57] ABSTRACT

Mineral wool fibers are coated with a latex particle in a beater dispersion technique. The coated mineral wool fibers which are in a slurry are then processed to form sheets which are dried to produce a flexible mineral wool blanket.

2 Claims, No Drawings

FLEXIBLE, INTERMEDIATE TEMPERATURE, MINERAL WOOL BOARD

BACKGROUND OF THE INVENTION

1. Field of the Invention

This invention relates generally to fiberboard and, more particularly, to a flexible mineral wool fiberboard.

2. Description of the Prior Art

Mineral wool fiberboard is widely used in the manufacture of ceiling material. Such material is usually light, strong, incombustible, fireproof, and is particularly useful in applications where low density and fire protection are of particular importance. Mineral wool fiberboard was normally made by adding a binder system to a slurry of water and mineral wool fibers. After sufficient mixing, the water may be removed in a mold or in a drainage wire to form a board. Oven drying normally is used to complete the water removal. The usual binder system for such a fiber-board is starch.

U.S. Pat. No. 3,223,580 discloses the formation of a mineral wool fiberboard by the forming of a mineral wool suspension, treating the fibers with alum, bringing the solution to a neutral pH by adding ammonium hydroxide to form aluminum hydroxide in situ, and then thereafter adding a synthetic rubber latex to bring about the smooth and even deposition of the rubber content of the latex onto the fibers. This results in a rigid board structure.

U.S. Pat. No. 3,082,145 deals with a process for preparing cork and fiber compositions wherein the fibers may be mineral fibers. A water slurry of cork and the fibers is formed, whereafter water soluble salts of polyvalent cations, such as aluminum, are added. An alkali is added to adjust the pH to about 5 in order to condition the cork granules and the fibers for the reception of the coating material. The coating material in emulsion form is added to the slurry under conditions of agitation, and a dilute coagulant in the form of an aqueous solution of water soluble salts of polyvalent metals, as for example alum, is added to exhaust the coating material from the dispersing medium.

Finally, U.S. Pat. No. 3,325,347 discloses a process for forming paper containing aluminum ions coordinated with hydroxide ions and ethylenically unsaturated aldehyde polymers. The process therein basically comprises first forming a paper pulp suspension. Aluminum ions are added to the suspension and uniformly mixed throughout the paper pulp. The paper ions are precipitated by the addition of sufficient basic precipitating agent until the aluminum ions have complexed with at least two hydroxyl ions per aluminum ion. At this time, a polymer, an acrolein polymer, is added. Thereafter, the paper pulp suspension containing polymer is formed into a fibrous web and dried.

SUMMARY OF THE INVENTION

A slurry of mineral wool fibers was prepared by dispersing mineral wool in water. Then a dilute acrylic latex is added to the system followed by the addition of alum. The alum causes the latex particles to achieve a positive charge. Then calcium hydroxide is added which produces an aluminum hydroxide-latex complex which still was not deposited on the fiber. To the slurry was then added a synthetic anionic polyelectrolyte which brings the positive latex particles together and deposits them onto the fiber. This is then followed by a drying which produces the flexible mineral wool sheet which now may be used for intermediate temperature insulation or blanks for molded acoustical materials.

DESCRIPTION OF THE PREFERRED EMBODIMENT

The invention relates to the production of a flexible, intermediate temperature, mineral wool board using an improved beater deposition process. The formed flexible, mineral wool sheet may be used for intermediate temperature insulation purposes or as blanks for molded acoustical materials.

The flexible material is formed on a Fourdrinier machine by laying down a web of mineral wool fibers from a water slurry onto which has been deposited particles of a synthetic acrylic latex. After the sheet has been formed, it is passed into an oven structure to completely dry the sheet. The slurry for forming the board is basically 98 percent water. The slurry is passed across a board-forming wire during which most of the water is removed, but an oven is necessary for the final drying of the board.

A slurry of mineral wool fibers is initially prepared by dispersing mineral wool in water. To this is added a dilute acrylic latex, for example, Ucar 891-Union Carbide, followed by the addition of alum. The mineral wool, acrylic latex, and alum are mixed for approximately 5 minutes. The alum causes the latex particles to achieve a positive charge. Then calcium hydroxide is added, and this produces an aluminum hydroxide-latex complex, but this complex is still not deposited on the fiber. Finally, to the slurry there is added a synthetic anionic polyelectrolyte, Accurac 24 or 27, which brings the positive latex particles together and deposits them on the mineral wool fiber.

The particular formulation which was utilized to carry out the above process is set forth with the parts given as percentage by weight and the formulation made up in a 2 percent slurry of water:

| Material | Percent |
|---|---|
| Mineral Wool | 79–92.5 |
| Acrylic latex, (Ucar 891-Union Carbide), anionic-self-crosslinking acrylic latex | 14–5.0 |
| Alum | 7–2.5 |
| Calcium hydroxide, (slaked or nonslaked) | enough until pH of 7–8 |
| Synthetic anionic polyelectrolyte, (Accurac 24-American Cyanamide), polyacrylamide, molecular weight of 2,000,000 | 0.02–0.05 |

This particular above formulation was added to the slurry of mineral wool in the manner as set forth above. After there had been the depositing of particles of the synthetic acrylic latex on the mineral wool fibers, the slurry was fed across a Fourdrinier machine to form a web of mineral wool fibers which would be subsequently dried to form a board structure.

What is claimed is:

1. The method of making a flexible, mineral wool blanket which comprises the steps of forming a slurry in water of mineral wool fibers, adding an anionic-self-crosslinking acrylic latex to the slurry, followed by the addition of alum to the slurry to cause the latex particles to assume a positive charge, adding calcium hydroxide to the slurry to form an aluminum hydroxide-latex complex, then adding a synthetic anionic polyelectroltye to the slurry to bring the positive latex particles together and deposit them onto the mineral wool fiber, and then forming a board structure from the slurry.

2. The method of claim 1 wherein the added synthetic anionic polyelectrolyte is polyacrylamide.

* * * * *